United States Patent
Voss (10) Patent No.: US 9,942,464 B2
(45) Date of Patent: Apr. 10, 2018

(54) METHODS AND SYSTEMS FOR MEDIA CAPTURE AND SEAMLESS DISPLAY OF SEQUENTIAL IMAGES USING A TOUCH SENSITIVE DEVICE

(71) Applicant: THOMSON LICENSING, Issy de Moulineaux (FR)

(72) Inventor: Neil D Voss, Darien, CT (US)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/475,239

(22) Filed: Sep. 2, 2014

(65) Prior Publication Data

US 2015/0350535 A1    Dec. 3, 2015

Related U.S. Application Data

(60) Provisional application No. 62/003,281, filed on May 27, 2014.

(51) Int. Cl.
| | |
|---|---|
| *H04N 5/232* | (2006.01) |
| *H04N 5/225* | (2006.01) |
| *G06F 3/0488* | (2013.01) |
| *G06F 3/01* | (2006.01) |
| *G06F 3/0481* | (2013.01) |

(52) U.S. Cl.
CPC ......... *H04N 5/23216* (2013.01); *G06F 3/017* (2013.01); *G06F 3/0481* (2013.01); *G06F 3/0488* (2013.01); *H04N 5/225* (2013.01); *H04N 5/23245* (2013.01); *H04N 5/23293* (2013.01)

(58) Field of Classification Search
CPC .................................................. H04N 5/23293
USPC ....................................................... 348/333.01
See application file for complete search history.

(56) References Cited

U.S. PATENT DOCUMENTS

| | | | | |
|---|---|---|---|---|
| 9,100,588 B1 * | 8/2015 | Seymour | ............... | H04N 5/2621 |
| 9,131,144 B2 * | 9/2015 | Park | ................... | H04N 5/23216 |
| 9,230,184 B2 * | 1/2016 | Sugimoto | .......... | G06K 9/00228 |
| 2005/0200846 A1 * | 9/2005 | Hoenig | ................ | G06T 7/0024 |
| | | | | 356/369 |
| 2006/0072028 A1 * | 4/2006 | Hong | ................. | H04N 5/23216 |
| | | | | 348/333.01 |
| 2006/0104623 A1 * | 5/2006 | Sasaki | ................ | H04N 5/23212 |
| | | | | 396/121 |
| 2006/0215753 A1 * | 9/2006 | Lee | ........................ | H04N 7/147 |
| | | | | 375/240.08 |
| 2010/0002071 A1 * | 1/2010 | Ahiska | ................... | H04N 5/217 |
| | | | | 348/36 |

(Continued)

FOREIGN PATENT DOCUMENTS

WO    WO2013109926    7/2013

*Primary Examiner* — Cynthia Segura
(74) *Attorney, Agent, or Firm* — Brian J. Dorini; Lily Neff (57) ABSTRACT

A method and apparatus are provided for capturing video on an electronic device having a touch screen. The method involves detecting a contact with the touch screen at a first predefined location corresponding to an image capture key, detecting movement of the contact, while continuous contact with the touch screen is maintained, from a first predefined location, and initiating video capture if the moving of the image capture key on the touch-sensitive display results in movement of the image capture key from the first predefined location to a second predefined location on the touch-sensitive display.

8 Claims, 12 Drawing Sheets

(56) References Cited

U.S. PATENT DOCUMENTS

| | | | |
|---|---|---|---|
| 2010/0214321 A1* | 8/2010 | Hokkanen | H04N 1/00336 345/660 |
| 2011/0001762 A1* | 1/2011 | Li | G06K 9/00604 345/649 |
| 2011/0193982 A1* | 8/2011 | Kook | H04N 5/23293 348/222.1 |
| 2012/0009896 A1 | 1/2012 | Bandyopadhyay et al. | |
| 2013/0061175 A1 | 3/2013 | Matas et al. | |
| 2013/0318471 A1* | 11/2013 | Freyhult | G06F 3/0481 715/798 |
| 2014/0285613 A1* | 9/2014 | Atkinson | H04N 7/147 348/14.01 |
| 2015/0058394 A1* | 2/2015 | Wang | H04L 65/602 709/201 |
| 2015/0116313 A1* | 4/2015 | Kimura | G06T 19/00 345/419 |
| 2015/0156552 A1* | 6/2015 | Wayans | H04N 21/47205 386/230 |
| 2015/0181123 A1* | 6/2015 | Pacurariu | H04N 5/3454 348/208.2 |
| 2015/0244938 A1* | 8/2015 | Petrakis | H04N 5/772 386/227 |
| 2015/0268822 A1* | 9/2015 | Waggoner | G06F 3/0488 715/722 |
| 2015/0348325 A1* | 12/2015 | Voss | H04N 5/3454 345/633 |
| 2016/0027201 A1* | 1/2016 | Saito | H04N 5/23216 345/475 |
| 2016/0227285 A1* | 8/2016 | Voss | G06T 7/90 |

* cited by examiner

METHODS AND SYSTEMS FOR MEDIA CAPTURE AND SEAMLESS DISPLAY OF SEQUENTIAL IMAGES USING A TOUCH SENSITIVE DEVICE

CROSS REFERENCE TO RELATED APPLICATIONS

This application claims priority from U.S. Provisional Application No. 62/003,281 filed May 27, 2014.

BACKGROUND OF THE INVENTION

Portable electronic devices are becoming more ubiquitous. These devices, such as mobile phones, music players, cameras, tablets and the like often contain a combination of devices, thus rendering carrying multiple objects redundant. For example, current touch screen mobile phones, such as the Apple iPhone or Samsung Galaxy android phone contain video and still cameras, global positioning navigation system, internet browser, text and telephone, video and music player, and more. These devices are often enabled an multiple networks, such as wifi, wired, and cellular, such as 3G, to transmit and received data.

The quality of secondary features in portable electronics has been constantly improving. For example, early "camera phones" consisted of low resolution sensors with fixed focus lenses and no flash. Today, many mobile phones include full high definition video capabilities, editing and filtering tools, as well as high definition displays. With these improved capabilities, many users are using these devices as their primary photography devices. Hence, there is a demand for even more improved performance and professional grade embedded photography tools.

For example, many users of mobile devices may use the camera feature in either video or camera mode. While taking a photo image, the user may desire to have taken a video instead. Likewise, a user may begin taking a video but realize that an image may have been more desirable. Often in mobile device camera applications, switching between the two modes is confusing or time consuming. A user may continue using the undesired format because the time required to switch formats may cause them to miss the photo opportunity.

Thus, it is desirable to overcome these problems with current cameras embedded in mobile electronic devices.

SUMMARY OF THE INVENTION

This summary is provided to introduce a selection of concepts in a simplified form that are further described below in the Detailed Description. The Summary is not intended to identify key features or essential features of the claimed subject matter, not is it intended to be used to limit the scope of the claimed subject matter.

In one embodiment, the present disclosure involves a method of capturing video on an electronic device having a touch screen. The method involves detecting a contact with the touch screen at a first predefined location corresponding to an image capture key, detecting movement of the contact, while continuous contact with the touch screen is maintained, from a first predefined location, and initiating video capture if the moving of the image capture key on the touch-sensitive display results in movement of the image capture key from the first predefined location to a second predefined location on the touch-sensitive display.

Another embodiment involves an apparatus including a touch screen, a memory, and a processor. The touch-sensitive display is for receiving user input. The memory is for storing instructions and video. The processor is configured to detect a contact with the touch screen at a first predefined location corresponding to an image capture key, detect movement of the contact, while continuous contact with the touch screen is maintained, from a first predefined location, and initiate video capture if the moving of the image capture key on the touch-sensitive display results in movement of the image capture key from the first predefined location to a second predefined location on the touch-sensitive display.

DETAILED DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION OF THE PREFERRED EMBODIMENT

The examples set out herein illustrate preferred embodiments of the disclosure, and such examples are not to be construed as limiting the scope of the invention in any manner.

Figure 1:
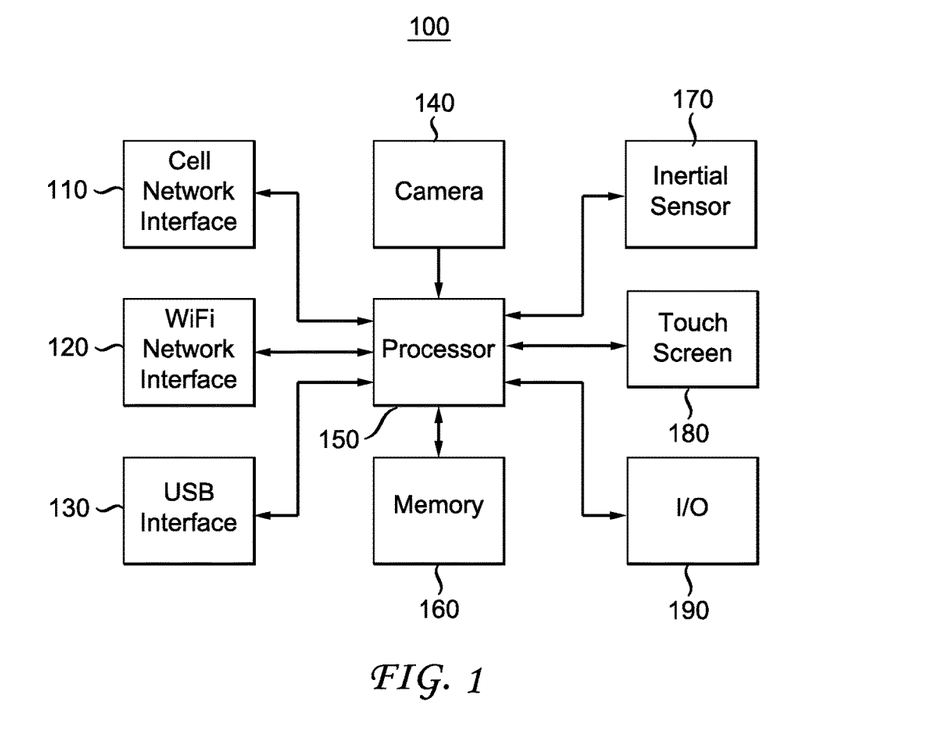
FIG. 1 shows a block diagram of an exemplary embodiment of a mobile electronic device in accordance with the present disclosure.

Referring to FIG. 1, a block diagram of an exemplary embodiment of mobile electronic device is shown. While the depicted mobile electronic device is a mobile phone 100, the invention may equally be implemented on any number of devices, such as music players, cameras, tablets, global positioning navigation systems, game consoles, etc. A mobile phone typically includes the ability to send and receive phone calls and text messages, interface with the Internet either through the cellular network or a local wireless network, take pictures and videos, play back audio and video content, and run applications such as word processing, programs, or video games. Many mobile phones include GPS and also include a touch screen panel as part of the user interface.

The mobile phone includes a main processor 150 that is coupled to each of the other major components. The main processor 150 may be a single processor or more than one processor as known by one skilled in the art. The main processor 150, or processors, routes the information between the various components, such as the network interfaces 110, 120, camera 140, inertial sensor 170, touch screen 180, and other input/output I/O interfaces 190. The main processor 150 also processes audio and video content for play back either directly on the device or on an external device through the audio/video interface. The main processor 150 is operative to control the various sub devices, such as the camera 140, inertial sensor 170 touch screen 180, and the USB interface 130. The main processor 150 is further operative to execute subroutines in the mobile phone used to manipulate data similar to a computer. For example, the main processor may be used to manipulate image files after a photo has been taken by the camera function 140. These manipulations may include cropping, compression, color and brightness adjustment, and the like.

The cell network interface 110 is controlled by the main processor 150 and is used to receive and transmit information over a cellular wireless network. This information may be encoded in various formats, such as time division multiple access (TDMA), code division multiple access (CDMA) or Orthogonal frequency-division multiplexing (OFDM). Information is transmitted and received from the device trough the cell network interface 110. The interface may consist of multiple antennas encoders, demodulators and the like used to encode and decode information into the appropriate formats for transmission. The cell network interface 110 may be used to facilitate voice or text transmissions, transmit and receive information from the internet. The information may include video, audio, and/or images.

The wireless network interface 120, or wifi network interface, is used to transmit and receive information over a wifi network. This information can be encoded in various formats according to different wifi standards, such as 802.11g, 802.11b, 802.11ac and the like. The interface may consist of multiple antennas encoders, demodulators and the like used to encode and decode information into the appropriate formats for transmission and decode information for demodulation. The wifi network interface 120 may be used to facilitate voice or text transmissions, transmit and receive information from the internet, etc. This information may include video, audio, and/or images.

The universal serial bus (USB) interface 130 is used to transmit and receive information over a wired link, typically to a computer or other USB enabled device. The USB interface 120 can be used to transmit and receive information, connect to the internet, transmit and receive voice and text calls, etc. Additionally, the wired link may be used to connect the USB enabled device to another network using the mobile devices cell network interface 110 or the wifi network interface 120. The USB interface 130 can be used by the main processor 150 to send and receive configuration information to a computer.

A memory 160, or storage device, may be coupled to the main processor 150. The memory 160 may be used for storing specific information related to operation of the mobile device and needed by the main processor 150. The memory 160 may be used for storing audio, video, photos, or other data stored and retrieved by a user.

The inertial sensor 170 may be a gyroscope, accelerometer, axis orientation sensor, light sensor or the like, which is used to determine a horizontal and/or vertical indication of the position of the mobile device.

The input output (I/O) interface 190, includes buttons, a speaker/microphone for use with phone calls, audio recording and playback, or voice activation control. The mobile device may include a touch screen 180 coupled to the main processor 150 through a touch screen controller. The touch screen 180 may be either a single touch or multi touch screen using one or more of a capacitive and resistive touch sensor. The smartphone may also include additional user controls such as but not limited to an on/off button, an activation button, volume controls, ringer controls, and a multi-button keypad or keyboard Turning now to FIG. 2, an exemplary mobile device display having an active display 200 according to the present invention is shown. The exemplary mobile device application is operative for allowing a user to record in any framing and freely rotate their device while shooting, visualizing the final output in an overlay on the device's viewfinder during shooting and ultimately correcting for their orientation in the final output.

Figure 2:
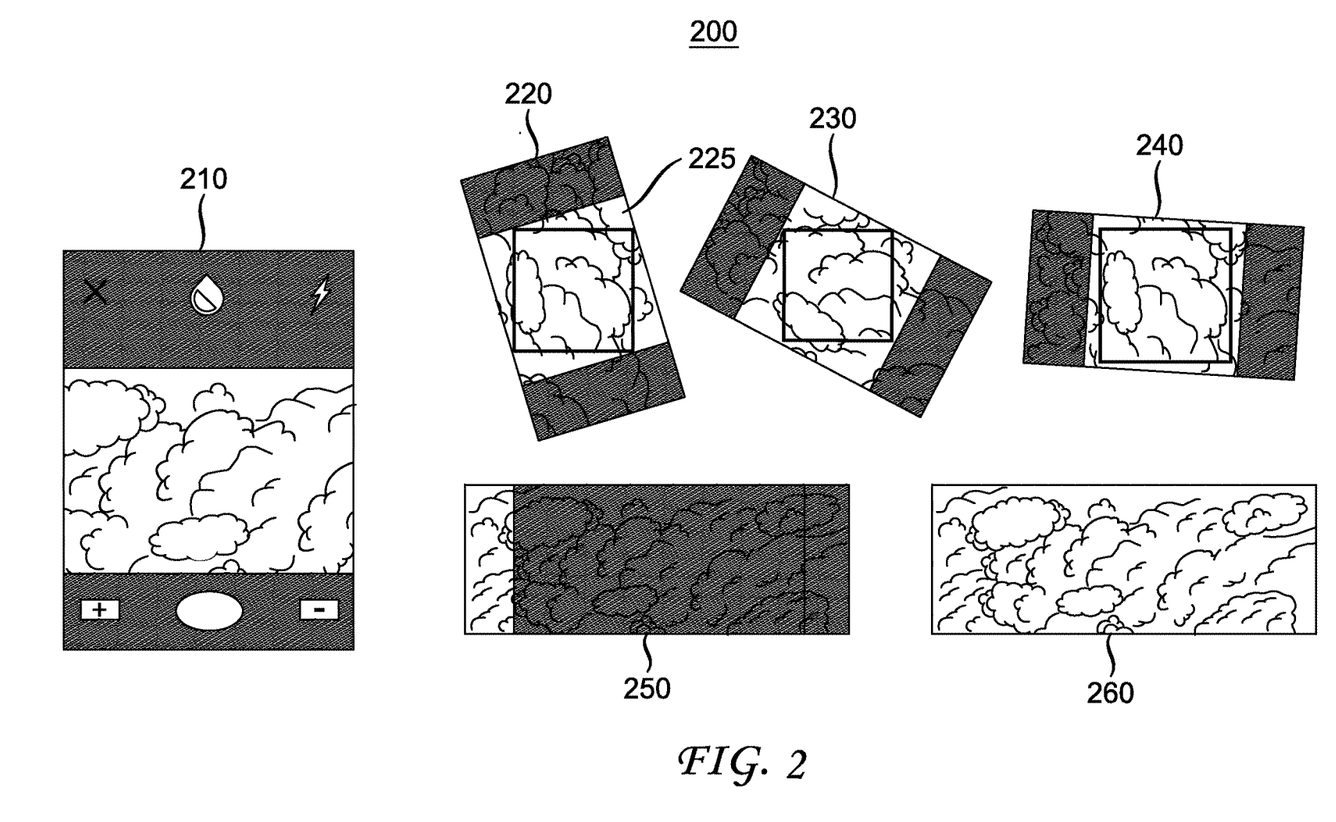
FIG. 2 shows an exemplary mobile device display having an active display in accordance with the present disclosure.

According to the exemplary embodiment, when a user begins shooting the user's current orientation is taken into account and the vector of gravity based on the device's sensors is used to register a horizon. For each possible orientation, such as portrait 210, where the device's screen and related optical sensor is taller than wide, or landscape 250, where the device's screen and related optical sensor is wider than tall, an optimal target aspect ratio is chosen. An inset rectangle 225 is inscribed within the overall sensor that is best-fit to the maximum boundaries of the sensor given the desired optimal aspect ratio for the given (current) orientation. The boundaries of the sensor are slightly padded in order to provide 'breathing room' for correction. The inset rectangle 225 is transformed to compensate for rotation 220, 230, 240 by essentially rotating in the inverse of the device's own rotation, which is sampled from the device's integrated inertial sensor. The transformed inner rectangle 225 is inscribed optimally inside the maximum available bounds of the overall sensor minus the padding. Depending on the device's current most orientation, the dimensions of the transformed inner rectangle 225 are adjusted to interpolate between the two optimal aspect ratios, relative to the amount of rotation.

For example, if the optimal aspect ratio selected for portrait orientation was square (1:1) and the optimal aspect ratio selected for landscape orientation was wide (16:9), the inscribed rectangle would interpolate optimally between 1:1 and 16:9 as it is rotated from one orientation to another. The inscribed rectangle is sampled and then transformed to fit an optimal output dimension. For example, if the optimal output dimension is 4:3 and the sampled rectangle is 1:1, the sampled rectangle would either be aspect filled (fully filling the 1:1 area optically, cropping data as necessary) or aspect fit (fully fitting inside the 1:1 area optically, blacking out any unused area with 'letter boxing' or 'pillar boxing'). In the end the result is a fixed aspect asset where the content framing adjusts based on the dynamically provided aspect ratio during correction. So for example a 16:9 video comprised of 1:1 to 16:9 content would oscillate between being optically filled 260 (during 16:9 portions) and fit with pillar boxing 250 (during 1:1 portions).

Additional refinements whereby the total aggregate of all movement is considered and weighed into the selection of optimal output aspect ratio are in place. For example, if a user records a video that is 'mostly landscape' with a minority of portrait content, the output format will be a landscape aspect ratio (pillar boxing the portrait segments). If a user records a video that is mostly portrait the opposite applies (the video will be portrait and fill the output optically, cropping any landscape content that falls outside the bounds of the output rectangle).

Figure 3:
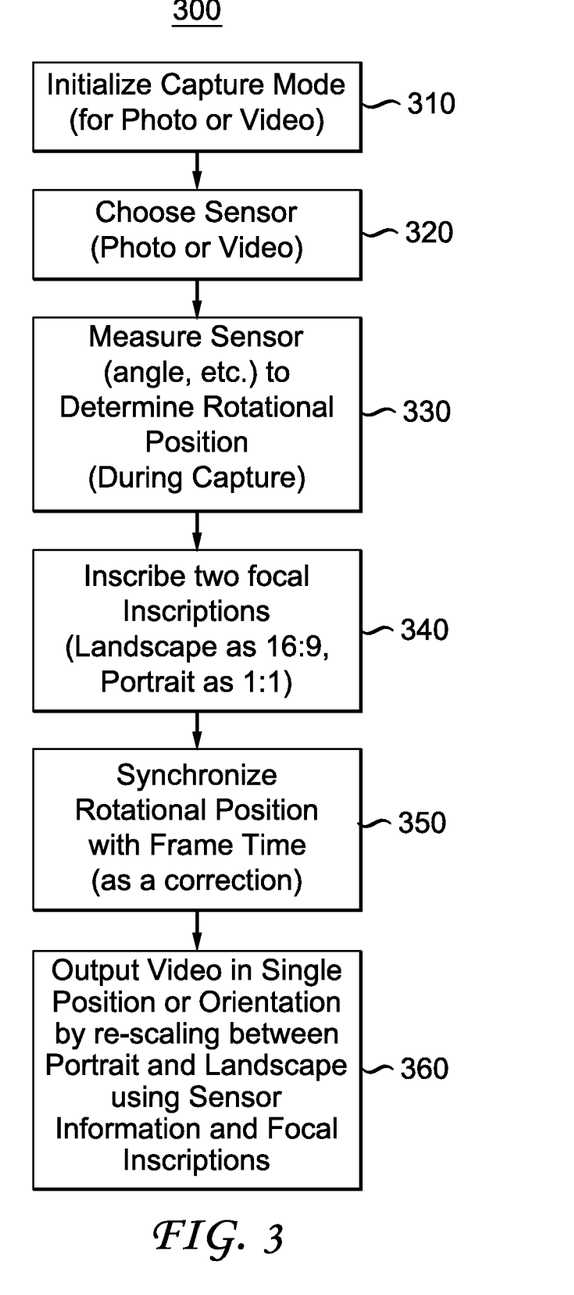
FIG. 3 shows an exemplary process for image stabilization and reframing in accordance with the present disclosure.

Referring now to FIG. 3, an exemplary process for image stabilization and reframing 300 in accordance with the present disclosure is shown. The system is initialized in response to the capture mode of the camera being initiated 310. The initialization may be initiated according to a hardware or software button, or in response to another control signal generated in response to a user action. Once the capture mode of the device is initiated, the mobile device sensor 320 is chosen in response to user selections. User selections may be made through a setting on the touch screen device, through a menu system, or in response to how the button is actuated. For example, a button that is pushed once may select a photo sensor, while a button that is held down continuously may indicate a video sensor. Additionally, holding a button for a predetermined time, such as 3 seconds, may indicate that a video has been selected and video recording on the mobile device will continue until the button is actuated a second time.

Once the appropriate capture sensor is selected, the system then requests a measurement from an inertial sensor 330. The inertial sensor may be a gyroscope, accelerometer, axis orientation sensor, light sensor or the like, which is used to determine a horizontal and/or vertical indication of the position of the mobile device. The measurement sensor may send periodic measurements to the controlling processor thereby continuously indicating the vertical and/or horizontal orientation of the mobile device. Thus, as the device is rotated, the controlling processor can continuously update the display and save the video or image in a way which has a continuous consistent horizon.

After the inertial sensor has returned an indication of the vertical and/or horizontal orientation of the mobile device, the mobile device depicts an inset rectangle on the display indicating the captured orientation of the video or image 340. As the mobile device is rotated, the system processor continuously synchronizes inset rectangle with the rotational measurement received from the inertial sensor 350.

The user may optionally indicate a preferred final video or image ration, such as 1:1, 9:16, 16:9, or any other ratio selected by the user. The system may also store user selections for different ratios according to orientation of the mobile device. For example, the user may indicate a 1:1 ratio for video recorded in the vertical orientation, but a 16:9 ratio for video recorded in the horizontal orientation. In this instance, the system may continuously or incrementally rescale video 360 as the mobile device is rotated. Thus a video may start out with a 1:1 orientation, but could gradually be rescaled to end in a 16:9 orientation in response to a user rotating from a vertical to horizontal orientation while filming. Optionally, a user may indicate that the beginning or ending orientation determines the final ratio of the video.

Figure 4:
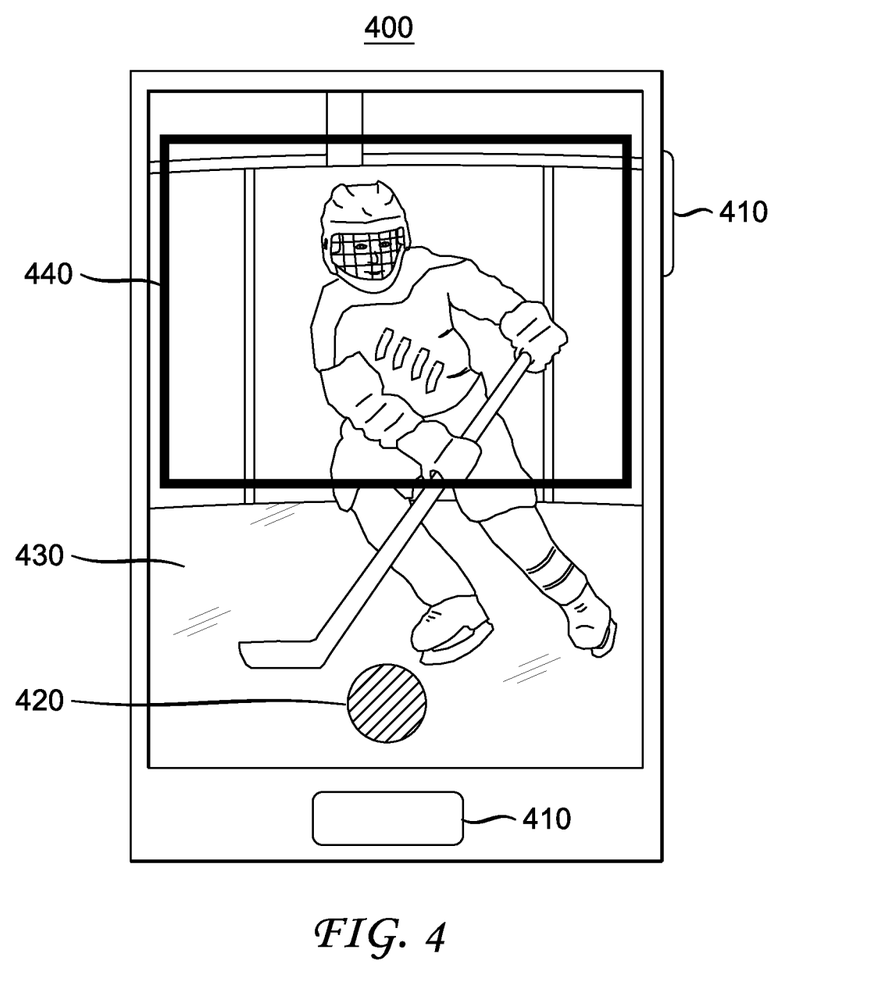
FIG. 4 shows an exemplary mobile device display having a capture initialization in accordance with the present disclosure.

Turning now to FIG. 4, an exemplary mobile device display having a capture initialization 400 is shown. The exemplary mobile device is show depicting a touch tone display for capturing images or video. According to an aspect of the present invention, the capture mode of the exemplary device may be initiated in response to a number of actions. Any of hardware buttons 410 of the mobile device may be depressed to initiate the capture sequence. Alternatively, a software button 420 may be activated through the touch screen to initiate the capture sequence. The software button 420 may be overlaid on the image 430 displayed on the touch screen. The image 430 acts as a viewfinder indicating the current image being captured by the image sensor. An inscribed rectangle 440, as described previously, may also be overlaid on the image to indicate an aspect ratio of the image or video to be captured.

Figure 5:
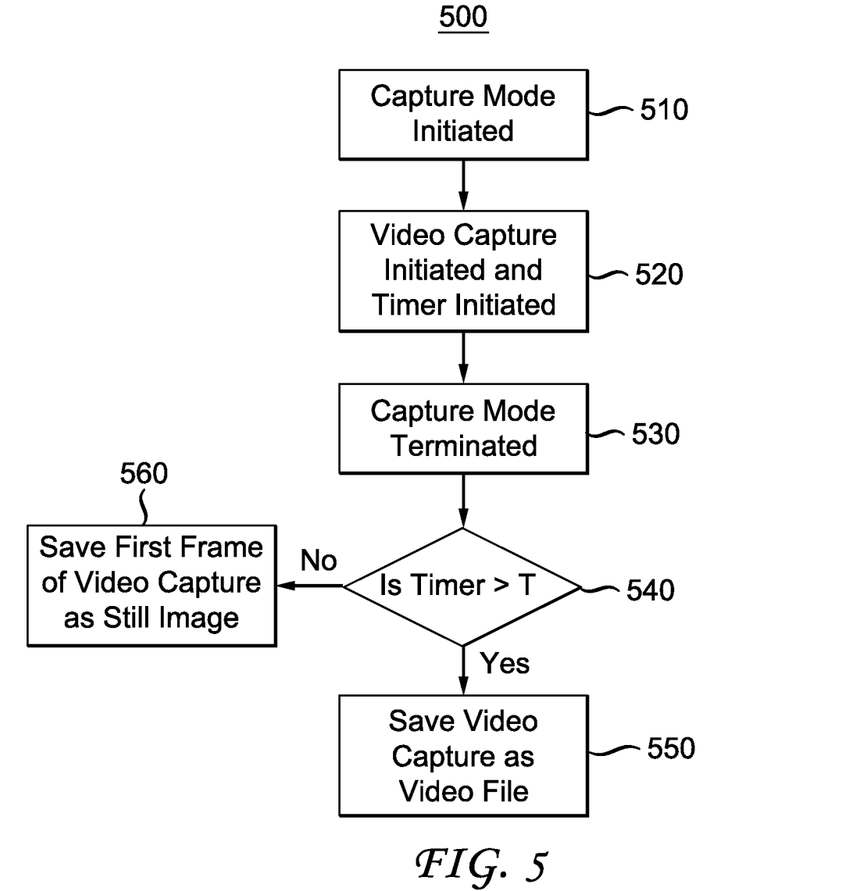
FIG. 5 shows an exemplary process for initiating an image or video capture in accordance with the present disclosure.

Referring now to FIG. 5, an exemplary process for initiating an image or video capture 500 in accordance with the present disclosure is shown. Once the imaging software has been initiated, the system waits for an indication to initiate image capture. Once the image capture indication has been received by the main processor 510, the device begins to save the data sent from the image sensor 520. In addition, the system initiates a timer. The system then continues to capture data from the image sensor as video data. In response to a second indication from the capture indication, indicating that capture has been ceased 530, the system stops saving data from the image sensor and stops the timer.

The system then compares the timer value to a predetermined time threshold 540. The predetermined time threshold may be a default value determined by the software provider, such as 1 second for example, or it may be a configurable setting determined by a user. If the timer value is less than the predetermined threshold 540, the system determines that a still image was desired and saves 560 the first frame of the video capture as a still image in a still image format, such as jpeg or the like. The system may optionally chose another frame as the still image. If the timer value is greater than the predetermined threshold 540, the system determines that a video capture was desired. The system then saves 550 the capture data as a video file in a video file format, such as mpeg or the like. The system may then return to the initialization mode, waiting for the capture mode to be initiated again. If the mobile device is equipped with different sensors for still image capture and video capture, the system may optionally save a still image from the still image sensor and start saving capture data from the video image sensor. When the timer value is compared to the predetermined time threshold, the desired data is saved, while the unwanted data is not saved. For example, if the timer value exceeds the threshold time value, the video data is saved and the image data is discarded.

Figure 6A:
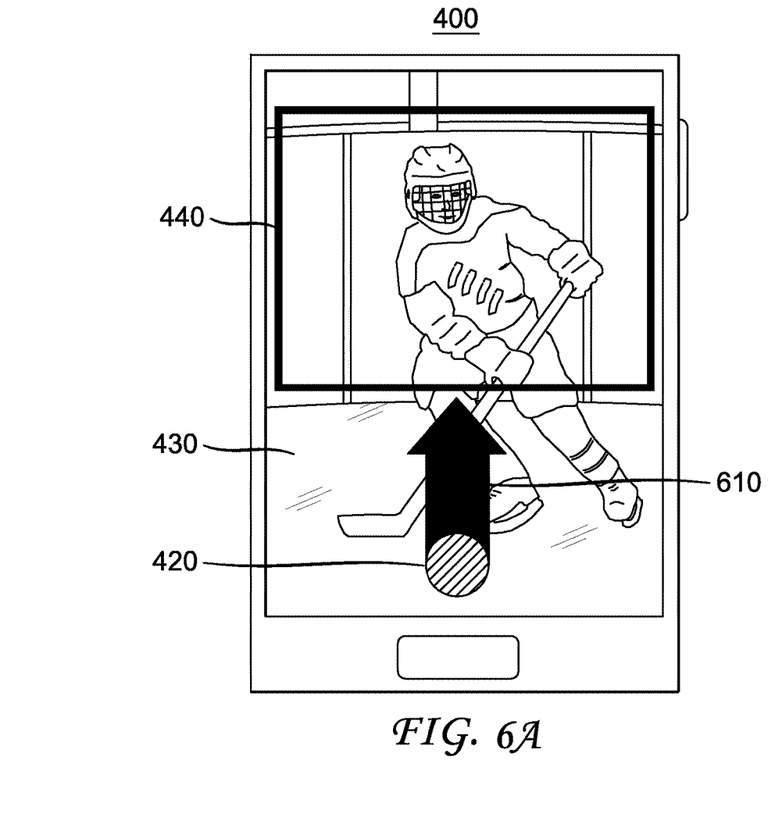
FIGS. 6A-6B show exemplary mobile device displays having a capture initialization featuring a slide-to-lock functionality for video capture in accordance with the present disclosure.
Figure 6B:
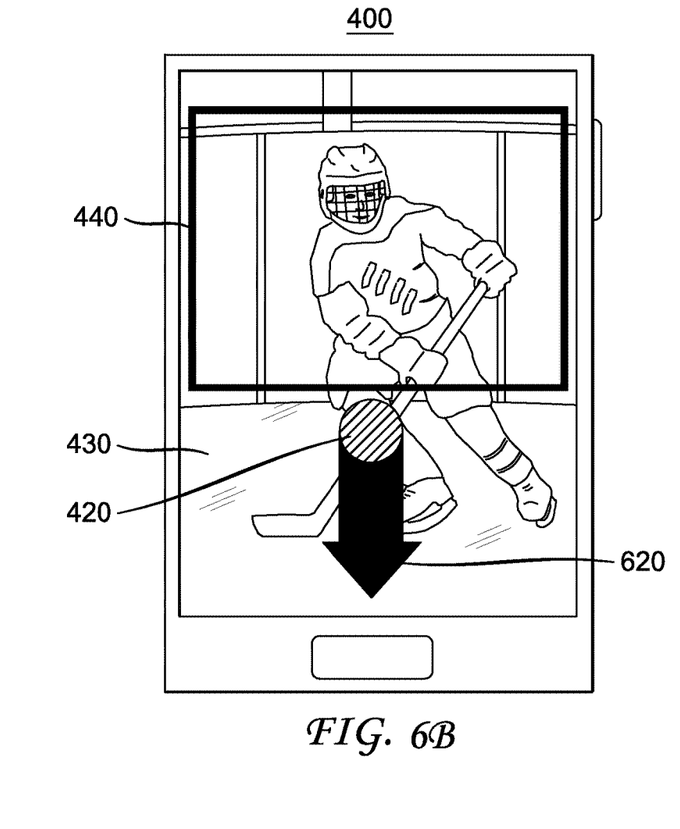

As mentioned above in regard to FIGS. 4 and 5, a user can press a button one time for a picture, or hold the button for a video. However, a user may wish to continue filming video, but not continue to hold the virtual button. Thus in one embodiment, the user may then hold and slide up to "lock" the video recording feature. The user releases the video recording feature by touching the screen or "unlocking" the button by sliding down. An example of this can be seen in FIGS. 6A and 6B. Here the software button or capture key 420 provided on the touch screen is slid up as represented by arrow 610 in FIG. 6A to engage video capture. To disengage or stop video capture, the software button or capture key 420 is slid down as represented by arrow 620 in FIG. 6B. It should be understood the directions and references to "up" and "down" are for illustrative purposes only and that such functionality could be implemented in using sliding motions in any direction.

Figure 7:
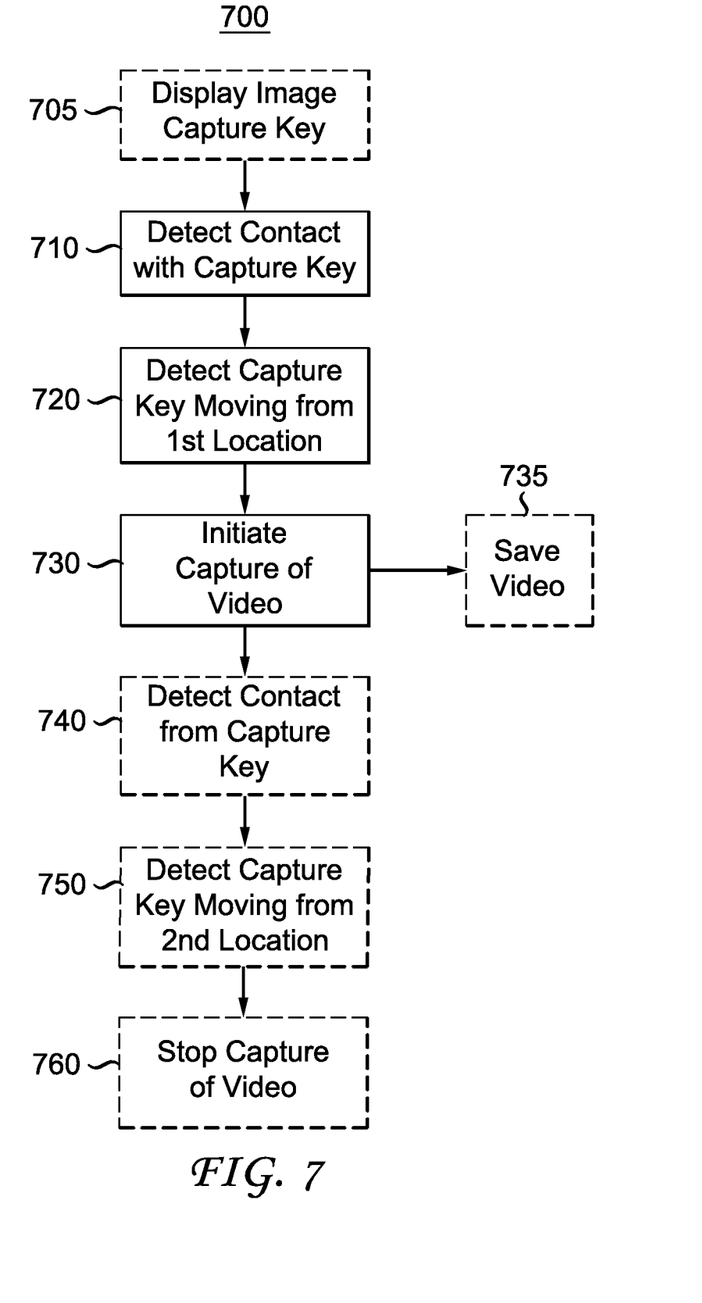
FIG. 7 shows and exemplary process for initiating video capture using slide-to-lock functionality in accordance with the present disclosure.

FIG. 7 depicts a flow diagram 700 of an exemplary methodology for implementing such a "slide-to-lock" functionality for video capture. At the most basic level, the methodology involves three steps. The first step is detecting contact with a capture key or software button (step 710). The next step is detecting movement of the contact, while continuous contact with the touch screen is maintained, from a first predefined location (step 720). The last step of the basic method is initiating video capture if the moving of the image capture key on the touch-sensitive display results in movement of the image capture key from the first predefined location to a second predefined location on the touch-sensitive display (step 730).

In certain embodiments, the methodology can further include additional steps. One such step is displaying the image capture key or software button on the touch screen (step 705). Another optional step is saving the captured video (step 735).

FIG. 7 also depicts optional steps for disengaging or stopping video capture. The first of these steps is detecting contact with the touch screen at a second predefined region corresponding to an image capture key (step 740). The next step is detecting movement of the contact, while continuous contact with the touch screen is maintained, from the second predefined location (step 750). The last step of deactivating video capture show is stopping video capture if the moving of the image capture key on the touch-sensitive display results in movement of the image capture key from the second predefined location to the first predefined location on the touch-sensitive display (step 760).

Once media recording, such as still images or videos, have been acquired using any of techniques discussed above, a user may want to format or package the media recording for more enjoyable consumption. One such type of formatting is grouping the media recording into a slide-show video. Using such slide show format functionality, when a user shoots multiple photos and videos in a single session, a user has the option of saving the media as a single video. The start timing of the photos and video can be determined through a default time or through the time stamps of the media. The media is then stored as one video.

For example, a user may take a series of still photos and then a video. The user then takes a few more photos and then saves the media. The user is given the option to save the content as individual photo and video files, or save the content as one video file. If the user opts to save the content as one video file, the user is further given the option to have the photos displayed in the video according to the time stamps of the photos. Thus, if the user took the first photo and then the second 3 seconds later and the third 1 second after that, the video would display the first photo for 3 seconds, the second for 1 second, and then the third . . . etc. A desirable effect is that a viewer of the video would also get a sense of timing with the content. The video shot would be placed in overall video media according to the time stamps of the video. Alternatively, the user may have the option to have the photos and video spaced at equal interviews. This spacing may be determined in part by the length of a video or by a default setting or a time determined by the user.

Figure 8:
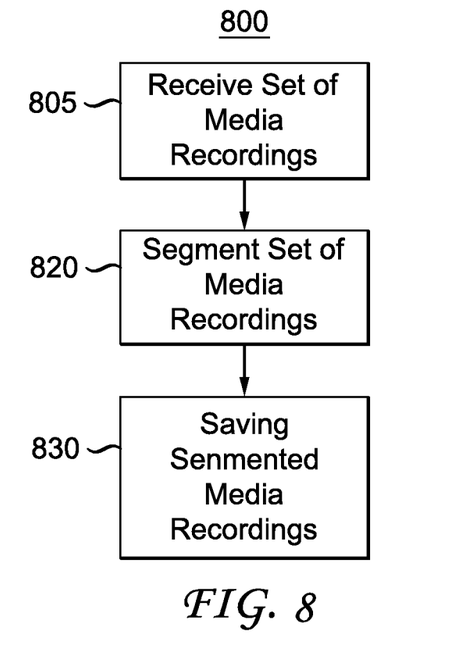
FIG. 8 shows and exemplary process for generating a slide show from media recordings in accordance with the present disclosure.

FIG. 8 depicts a flow diagram 800 of an exemplary methodology for implementing such slide-show functionality. At the most basic level, the methodology involves three steps. The first step is receiving a set of media recordings, such as still images and videos (step 810). The next step is segmenting the set of media recordings (step 820). The last step of the basic method is saving the segmented media recordings as a single video recording (step 830). An example of how segmenting is performed can be seen in FIG. 9

Figure 9:
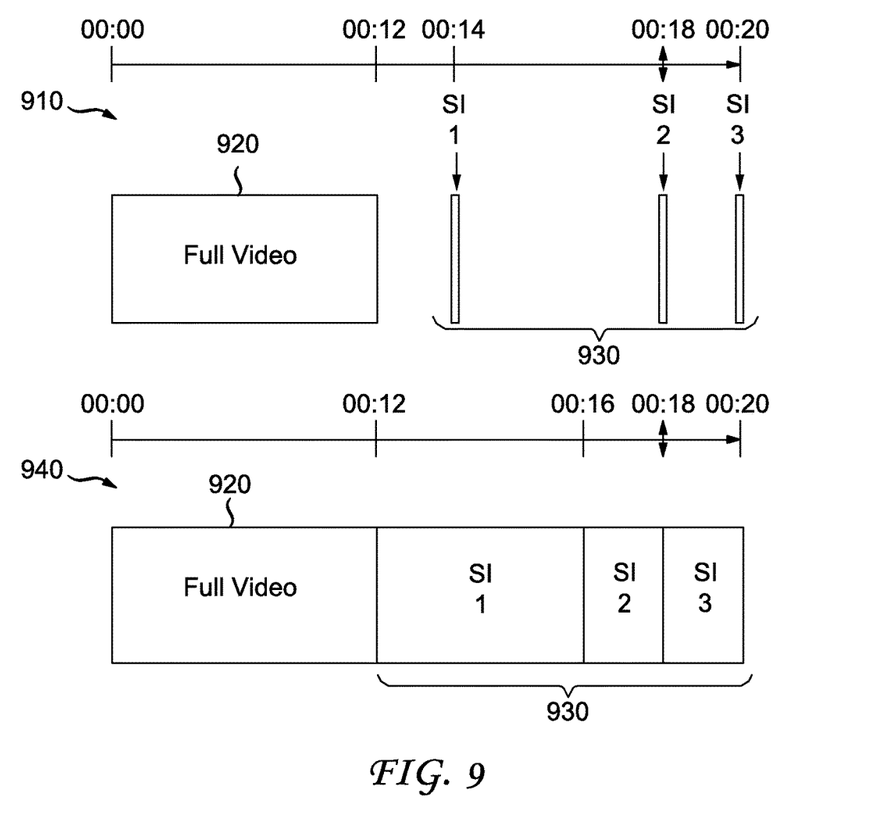
FIG. 9 shows one embodiment of how media recording can be segmented to generate a slide show in accordance with the present disclosure.

FIG. 9 illustrates a first exemplary set of media recordings and a first segmentation example. The raw video and still image recording 910 results is an exemplary first set of media recordings using a media device, such as media device 400. A user operating media device 400 can use a button, such as software button 420, on the media device to capture media recordings such as the set of media recordings 910 depicted in FIG. 9. In one possible operation, a user would hold a capture control button, or other media capture control mechanism, and start capturing and recording video. If a user held or actuated the capture control button 420 of the media device for 12 seconds, then the full video portion 920 of the set of media recordings 910 can be captured. The time indices of FIG. 9 indicate that the raw recorded video 920 is 12 seconds in duration. The user released the capture button at the 12 second mark. Two seconds later, the user tapped the capture button 420 and the media device 400 effectively recorded a still image S1 at the 14 second mark. Four second later, at the 18 second mark, the user once again tapped the capture button 420 and a second still image S2 was captured. Finally, two second later, at the 20 second mark, the user once again tapped the capture button 420 and a third still image S3 was captured. The full raw video 920 and the set of three still images 930 together make up the first example set of media recordings 910. Note, that the full set of recordings is 20 seconds in capture time. According to an embodiment of the invention, such raw media recordings 910 is segmented such that the video 920 is comprises 12 seconds of the slide show video 940, still image S1 comprises 4 seconds (the time between still images S1 and S2), still image S2 comprises 2 second (the time between still imaged S2 and S3), and still images S3 comprises 2 seconds (the remainder of the slide show duration). In other embodiments, the duration of the slide show as well as the duration of any of the media recordings can be adjusted by the user.

A problem arises when a user generates a video using multiple still images or videos displayed in quick succession. A viewer may not be able to quickly focus and determine a region of interest of a photo. The disclosed functionality addresses this problem by cropping a photo such that the region of interest of all photos in the sequence are located in relatively the same location. In certain embodiments, when multiple photos and videos are added to one media video presentation, regions of interest are identified and are reframed to relocated the region of interest the same location in the video permitting the viewer to quickly comprehend the video. The location of the region of interest can be traversed over the video in a uniform spatially and temporally. Objects of interest in the region of interest can be resized to fit into the viewer's perceptional area so objects of interest are roughly a consistent size. An example of this can be seen in FIG. 10.

Figure 10:
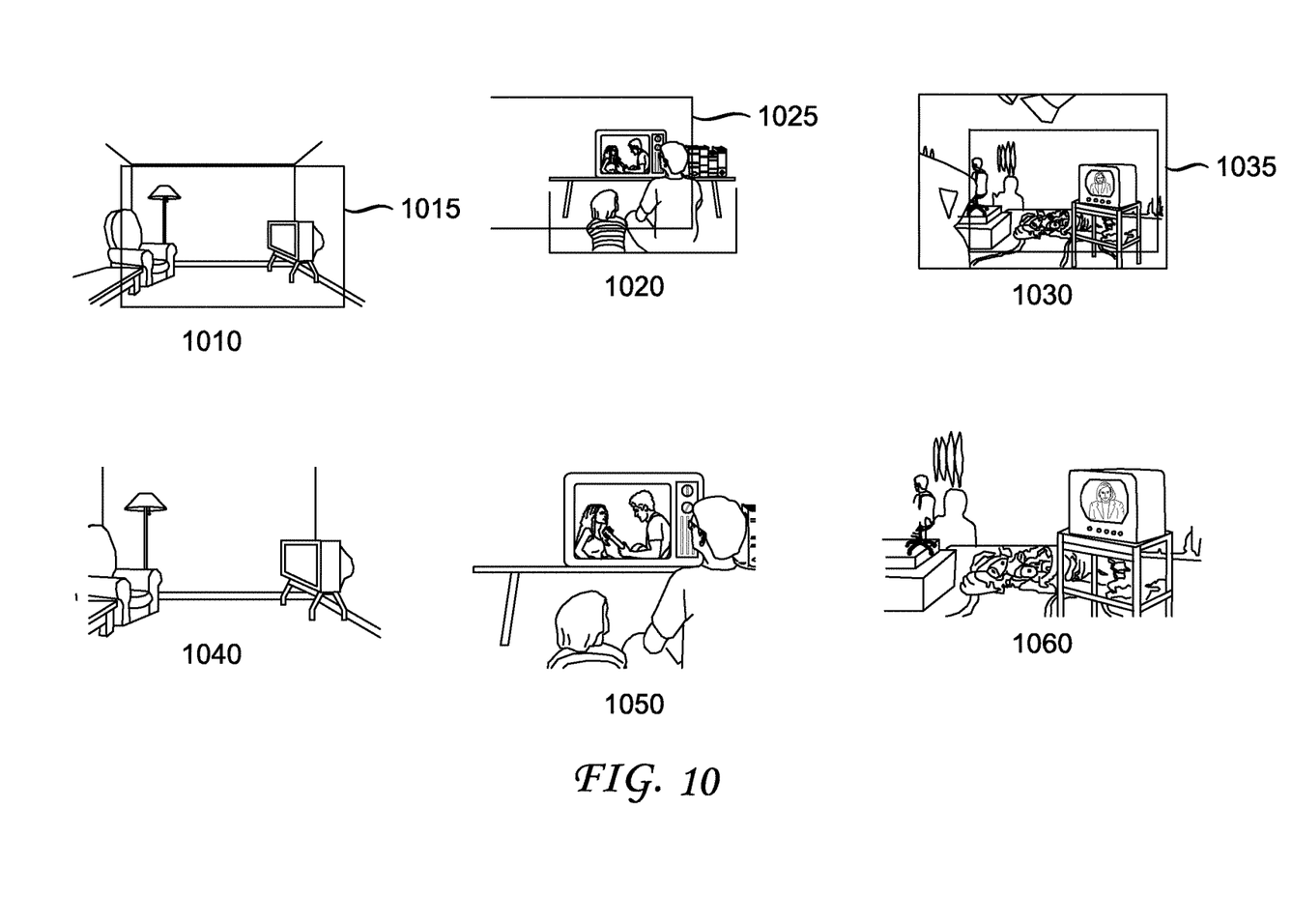
FIG. 10 shows an exemplary embodiment of reframing media recordings for inclusion in a slide show in accordance with the present disclosure.

In FIG. 10, three images 1010, 1020 and 1030 are processed to determine an area of interest. In image 1010 the area of interest is indicated by framing 1015. In image 1020 the area of interest is indicated by framing 1025. In image 1030 the area of interest is indicated by framing 1035. The result of the reframing can be seen in FIGS. 1040, 1050, and 1060. Image 1040 is the framing 1015 of FIG. 1010 resized to fill the full image size. Image 1050 is the framing 1025 of FIG. 1020 resized to fill the full image size. Image 1060 is the framing 1035 of FIG. 1030 resized to fill the full image size. Other possible implementation will be apparent to one skilled in the art.

In another other embodiments, once media recording, such as still images or videos, have been acquired using any of techniques discussed above the content may be packaged or formatted automatically base on the user's interaction or history, such as the type of media recordings and user actions. For example, if a user does a few bursts of still images and then holds for video. The system can determine that a video is desired. In another example, if a user takes multiple shots of the same image, they are probably looking for the best image. The multiple images can be sampled or otherwise combined into one good image, or the best image can be selected, or the user can be presented with the option of choosing the best of multiple images to. A similar functionality can be implemented for sets of multiple videos. An example of a methodology for implementing this functionality can be seen in FIG. 11 and FIGS. 12A-12E.

Figure 11:
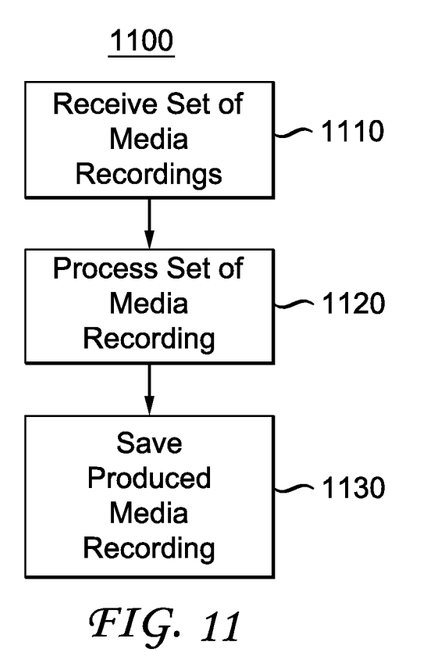
FIG. 11 shows an exemplary process for automatically formatting media recordings in accordance with the present disclosure.

FIG. 11 depicts a flow diagram 1100 of an exemplary methodology for implementing automatic media conversion or formatting. At the most basic level, the methodology involves three steps. The first step is receiving a set of media recordings, such as still images and videos (step 1110). The next step is processing the set of media recordings to produce a single media recording (step 1120). The last step of the basic method is saving the produced media recordings as a single video recording (step 1130). Some examples of processing that can be performed can be seen in FIGS. 12A-12E.

Figure 12A:
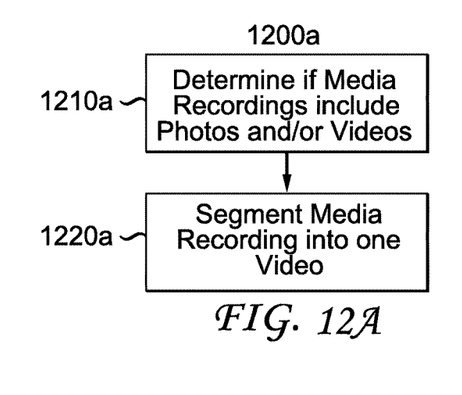
FIGS. 12A-12E show exemplary processes of automatic formatting or converting of media recordings in accordance with the present disclosure.

FIG. 12A depicts an exemplary flow diagram 1200a for automatic conversion processing similar to the slide show functionality discussed above. The first step in the processing is determining that the set of media recordings contains a mix of still images and videos (step 1210a). Based on this determination, the media recordings are segmented together to form a single video media recording (step 1220a).

Figure 12B:
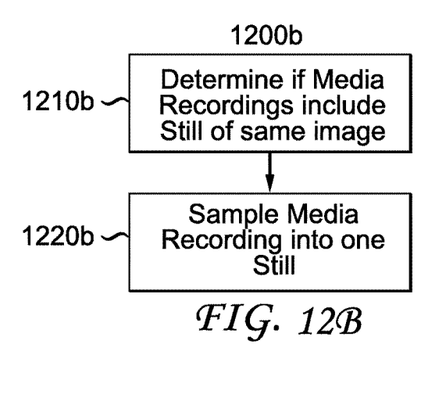

FIG. 12B depict an exemplary flow diagram 1200b for automatic conversion processing that handles a set of media recordings having set of photos of the same image. The first step in the processing is determining that the set of media recordings contains still images of the same image (step 1210b). Based on this determination, the media recordings are sampled and combined to form a single still image media recording (step 1220b).

Figure 12C:
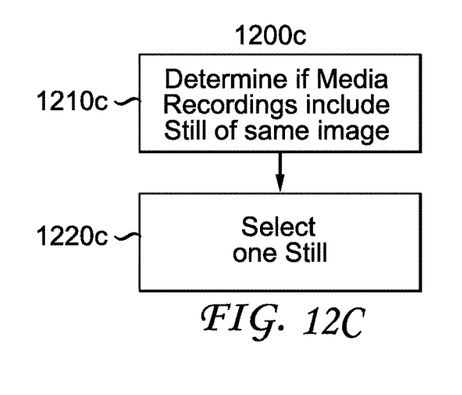

FIG. 12C depict another exemplary flow diagram 1200c for automatic conversion processing that handles a set of media recordings having set of photos of the same image. The first step in the processing is determining that the set of media recordings contains still images of the same image (step 1210c). Based on this determination, the best still image is selected from the multiple still images (step 1220c).

Figure 12D:
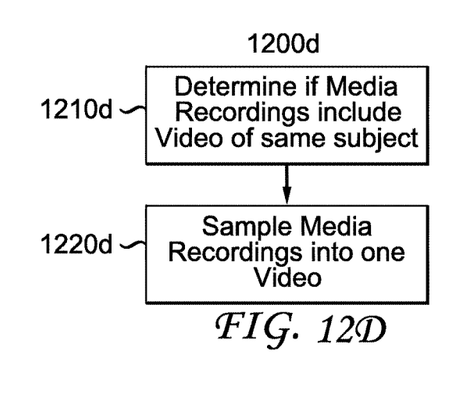

FIG. 12D depict an exemplary flow diagram 1200d for automatic conversion processing that handles a set of media recordings having multiple videos of the same subject. The first step in the processing is determining that the set of media recordings contains videos of the same subject (step 1210d). Based on this determination, the media recordings are sampled and combined to form a single video media recording (step 1220d).

Figure 12E:
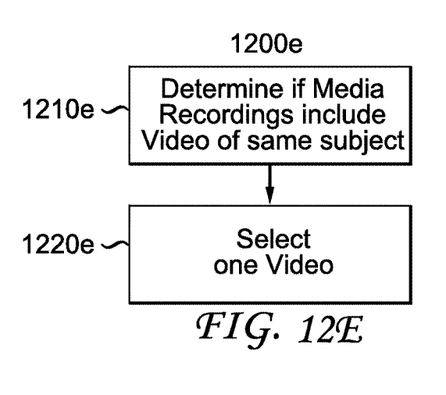

FIG. 12E depict another exemplary flow diagram 1200e for automatic conversion processing that handles a set of media recordings having multiple videos of the same subject. The first step in the processing is determining that the set of media recordings contains still videos of the same subject (step 1210e). Based on this determination, the best video is selected from the multiple videos (step 1220e).

It should be understood that the elements shown and discussed above, may be implemented in various forms of hardware, software or combinations thereof. Preferably, these elements are implemented in a combination of hardware and software on one or more appropriately programmed general-purpose devices, which may include a processor, memory and input/output interfaces. The present description illustrates the principles of the present disclosure. It will thus be appreciated that those skilled in the art will be able to devise various arrangements that, although not explicitly described or shown herein, embody the principles of the disclosure and are included within its scope. All examples and conditional language recited herein are intended for informational purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The invention claimed is:

1. A method of capturing video on a device having a touch screen, the method comprising:
   detecting a contact with the touch screen at a first predefined location corresponding to an image capture key;
   detecting movement of the contact, while continuous contact with the touch screen is maintained, from the first predefined location;
   initiating video capture if the moving of the image capture key on the touch-sensitive display results in movement of the image capture key from the first predefined location to a second predefined location on the touch-sensitive display;
   providing a continuously synchronized inset rectangle framing a sequence of captured images with a rotational measurement received from an inertial sensor, wherein an aspect ratio of the inset rectangle is continuously adjusted based on the rotational measurement;
   determining a region of interest in each image in said sequence of captured images; and
   adjusting said captured images such that said region of interest of all images in a sequence are located in relatively the same location by reframing and relocating said regions of interest spatially and temporally;
   resizing said region of interest to fill a full image size of a viewing area of the viewer of the device such that it is rendered to be of a consistent size.

2. The method of claim 1 further comprising: saving the captured video.

3. The method of claim 1 further comprising: displaying an image capture key on the touch screen.

4. The method of claim 1 further comprising:
   detecting contact with the touch screen at a different predefined region corresponding to an alternate image capture key;
   detecting movement of the contact, while continuous contact with the touch screen is maintained, from the different predefined location; and
   stopping video capture if the moving of the image capture key on the touch-sensitive display results in movement of the alternate image capture key from the different predefined location to the first predefined location on the touch-sensitive display.

5. An apparatus comprising:
   a touch-sensitive display for receiving user input;
   a memory for storing instructions and video; and
   a processor configured to detect a contact with the touch screen at a first predefined location corresponding to an image capture key, detect movement of the contact, while continuous contact with the touch screen is maintained, from the first predefined location, and initiate capture of video if the moving of the image capture key on the touch-sensitive display results in movement of the image capture key from the first predefined location to a second predefined location on the touch-sensitive display;
   said processor configured to provide a continuously synchronized inset rectangle framing a sequence of captured images with a rotational measurement received from an inertial sensor, wherein an aspect ratio of the inset rectangle is continuously adjusted based on the rotational measurement; and
   said processor further configured to determine a region of interest in each image in said sequence of captured images and adjusting said captured images such that said region of interest of all images in a sequence are located in relatively the same location by reframing and relocating said regions of interest spatially and temporally and said region of interest are resized to fill a full image size of a viewing area of the viewer of the device such that it is rendered to be of a consistent size.

6. The apparatus of claim 5 further comprising: a camera for generating the video content.

7. The apparatus of claim 5 wherein the processor is further configured to save the video content to the memory.

8. The apparatus of claim 5 wherein the processor is further configured to display an image capture key on the touch screen.

* * * * *